United States Patent Office 3,307,709
Patented Mar. 7, 1967

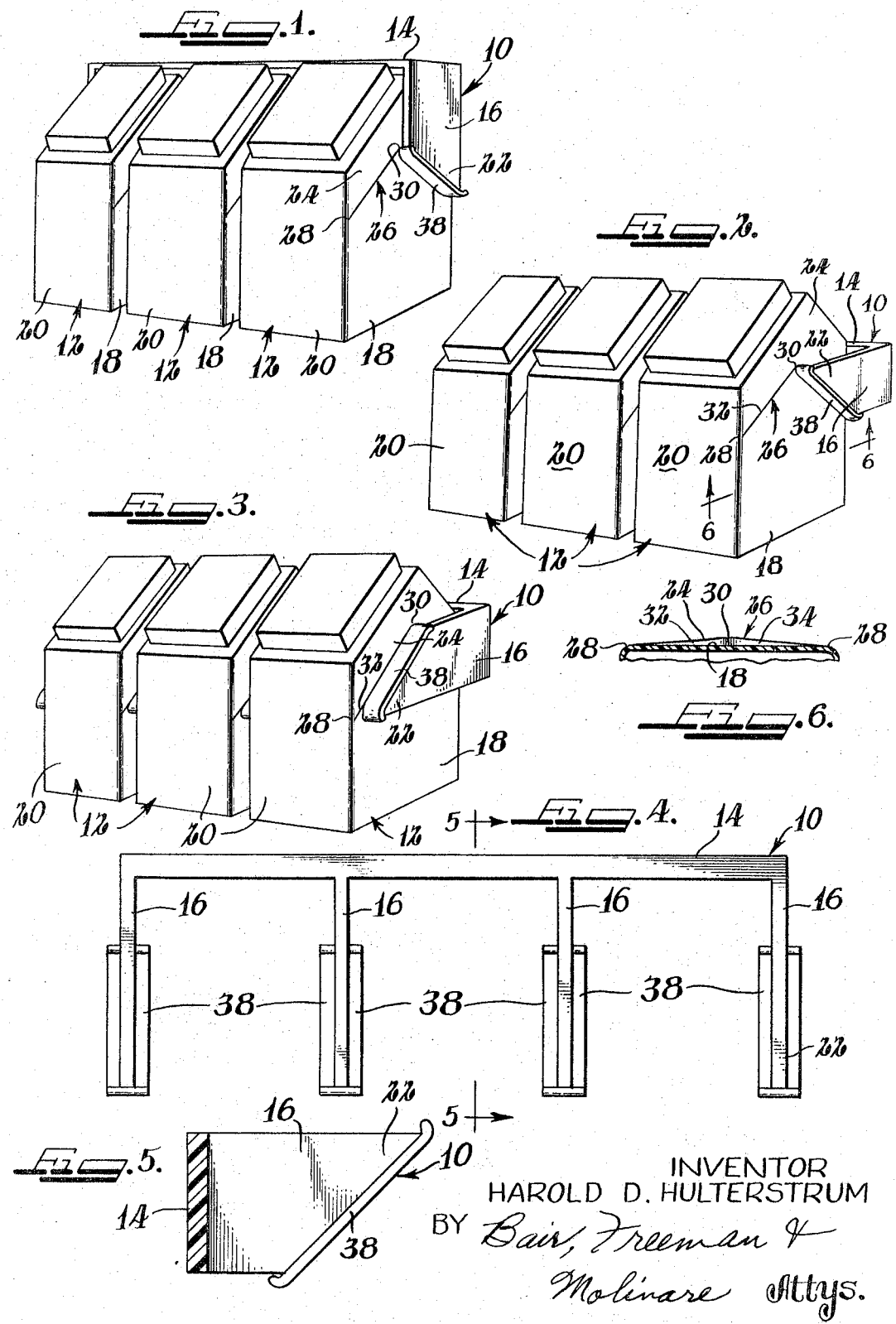

3,307,709
RACK AND CONTAINER SET
Harold D. Hulterstrum, Baraboo, Wis., assignor to Flambeau Plastics Corporation, a corporation of Wisconsin
Filed Feb. 15, 1965, Ser. No. 432,766
3 Claims. (Cl. 211—71)

This invention relates to an improved storage rack for containers and it particularly relates to an improved spice rack and container set.

In the design and construction of various types of storage racks with containers mounted thereon there is often a problem associated with providing means for securing the rack on a mounting surface. For example, often the user of a rack desires to store it on a vertical surface, as a wall, but the rack is adapted to be mounted upon a overhead horizontal surface, such as the lower surface of a cabinet. This problem may also be reversed, that is, when the rack is desired to be mounted upon a horizontal surface, it is adapted to be mounted only upon a vertical surface. Known storage racks fail to overcome such a problem in a manner which is simple and economical in structure and is yet attractive in appearance.

It is therefore an important object of this invention to provide an improved storage rack or support member having a plurality of containers mounted thereon, wherein failings of prior art structures are substantially avoided.

It is also an object of this invention to provide an improved rack of a plurality of containers wherein the mounting of the rack may be accomplished either on a horizontal surface or a vertical surface, as desired.

It is a further object of this invention to provide an improved rack and container set wherein there is a unique cooperation between the containers and support arms of the rack so that the containers are supported by the rack in a variety of positions relative thereto, including transversely and longitudinally.

It is another object of this invention to provide an improved spice rack and container set which has a high degree of flexibility in mounting and which is further characterized by its economy and simplicity of construction.

Further purposes and objects of this invention will appear as the specification proceeds.

A particular embodiment of the present invention is illustrated in the accompanying drawings wherein:

FIGURE 1 is a perspective view of my improved rack and container set wherein the rack is mounted on an overhead horizontal surface;

FIGURE 2 is a perspective view, similar to FIGURE 1, except that the rack is mounted upon a vertical surface;

FIGURE 3 is a perspective view, similar to FIGURE 2, except the rack is inverted;

FIGURE 4 is a top plan view of the spice rack only;

FIGURE 5 is a sectional view taken along the line 5—5 of FIGURE 4; and

FIGURE 6 is a sectional view taken along the line 6—6 of FIGURE 2.

Referring to the drawings, my novel combination of a rack or support member 10, which cooperates with containers 12 supported on the rack 10, is shown in three different positions in FIGURES 1–3. The support member or rack 10 includes a base portion 14 having a plurality of outwardly extending, substantially parallel arms 16. The rack is preferably made of an integrally molded, rigid plastic material so as to effect economy and simplicity in the construction thereof.

The support rack 10 is adapted to receive any number of containers 12, although the drawings show the use of only three such containers. The containers 12 are interposed between the spaced arms 16 and are retained in place thereby. Each container 12 comprises a pair of opposed side walls 18, a front wall 20, and a rear wall.

One important feature of the applicant's combination is in the novel cooperation between the side walls 18 of the containers 12 and the outer end portions 22 of the supporting arms 16. The side walls 18 of the containers 12 have outwardly raised upper portions 24 which define a downwardly facing edge portion 26. In order to provide the important advantages of the invention, the terminal portions 28 of the edge 26, at the container front and rear walls, are positioned further down on the side walls 18 than is the central portion 30 of the edge 26. Preferably, the downwardly facing edge 26 has an inverted V-shape. Thus, the downwardly facing edge 26 preferably has an upwardly and rearwardly extending forward leg 32 and an upwardly and frontwardly extending rear leg 34, which legs intersect intermediate the front and rear walls of the container 12 at the central portion 30. The legs 32 and 34 are desirably at approximately right angles to each other.

Cooperating with the supporting edge 26 are the outer end portions 22 of the arms 16. The outer end portions 22 are shaped to conform to at least a portion of the downwardly facing edge 26; in the preferred embodiment shown the outer end portion is a slanted planar surface. The slanted surface 36 is preferably at about a 45° angle so that the surface 36 engages the underside of the edge 26, at either the front or rear leg 32 or 34, each of which is slanted about 45° to the horizontal, so as to provide upright support for the containers 12. To provide the proper stability for the containers 12 while they are retained in the upright position, the edge 26 is located above the center of gravity of the container.

An important feature in the construction of the arm end portions 22 is the provision of a slanted outer flange 38 which projects laterally from both sides of each of the arms 16 so as to engage the container bodies 12 at the edge portions 26. This enables the container to be spaced from the main portions of the arm 16, thereby avoiding undesired interference therebetween when removing or remounting the containers 12. Also, the rack 10 may be constructed so that the distance between the inwardly facing edges of adjacent flanges 38 is slightly less than the distance between the outer surfaces of the side walls 18, immediately below the edge 26, so that the arms firmly grip the flexible containers 12.

In FIGURES 1–3, various relative positions between the rack 10 and containers 12 are shown. In FIGURE 1, the base 14 is shown for mounting the rack 10 upon a horizontal overhanging wall or surface and the inner sides of the flanges 38 cooperate with the rearward legs 34 of the edges 26. In FIGURE 4, the rack 10 is mounted upon a horizontal surface and the inner sides of the flanges 38 engage the rearward legs 34. In FIGURE 3, again the rack 10 is mounted upon a vertical surface, but the rack is inverted from the position of FIGURE 2 and the outer sides of the flanges 38 engage the forward legs 32 to provide the desired upright support. Thus, the rack 10 may be mounted in a variety of positions and yet proper upright support is provided for the containers 12 at all such positions.

While in the foregoing there has been provided a detailed description of a particular embodiment of the present invention, it is to be understood that all equivalents obvious to those having skill in the art are to be included within the scope of the invention as claimed.

What I claim and desired to secure by Letters Patent is:

1. A combination of a support rack adapted to be mounted on a surface and containers having side walls and being removably received by said support rack, said combination comprising outwardly projecting arms on said support rack for receiving said containers therebetween, portions of said side walls defining downwardly facing edges, said edges each having a central portion and end portions, said central portion being higher than said end portions, and said arms having outer ends constructed and arranged to engage said downwardly facing edges between said central portion and one of said end portions so that said arms support said containers in an upright position regardless of the relative position between the rack and containers.

2. A combination of a support rack adapted to be mounted on a surface and containers having side walls and being removably received by said support rack, said combination comprising outwardly projecting arms on said support member for receiving said containers therebetween, outwardly raised portions on said side walls for defining inverted V-shaped downwardly facing edge portions, said V-shaped portions defining a pair of legs, and said arms having slanted end portions constructed and arranged to engage at least one of the legs of said inverted V-shaped edge portions so that said arms support said containers in an upright position regardless of the relative position between said rack and said containers and regardless of whether the rack is mounted on a vertical surface or a horizontal surface.

3. The device of claim 2 wherein said end portions include flanges extending laterally from both sides of said arms for engaging the legs of said V-shaped edge portions.

References Cited by the Examiner

UNITED STATES PATENTS 2,491,652 12/1949 Feerick _____ 211—71
2,791,392 5/1957 Black _____ 248—312 X

FOREIGN PATENTS 868,764 5/1961 Great Britain.

CLAUDE A. LE ROY, *Primary Examiner.*

R. P. SEITTER, *Assistant Examiner.*